United States Patent [19]

Nagura et al.

[11] Patent Number: 4,773,845

[45] Date of Patent: Sep. 27, 1988

[54] TOGGLE-TYPE MOLD-CLAMPING APPARATUS

[75] Inventors: Toshiharu Nagura; Yoshihiro Okabe, both of Akashi, Japan

[73] Assignee: Toyo Machinery & Metal Co., Ltd., Hyogo, Japan

[21] Appl. No.: 941,243

[22] Filed: Dec. 12, 1986

[30] Foreign Application Priority Data

Dec. 13, 1985 [JP] Japan .................................. 60-279214
Oct. 6, 1986 [JP] Japan .................................. 61-236287

[51] Int. Cl.[4] .................... B29C 33/20; F16C 33/10
[52] U.S. Cl. .................................... 425/592; 384/380; 425/593; 425/451.5; 425/451.6
[58] Field of Search ............... 425/592, 593, 451.5, 425/451.6; 384/284, 285, 907, 398, 397, 380; 264/328.7, 328.11

[56] References Cited

U.S. PATENT DOCUMENTS

| 707,176 | 8/1902 | Steiner | 384/285 |
|---|---|---|---|
| 1,398,219 | 11/1921 | Acheson | 384/284 |
| 1,697,017 | 1/1929 | Murphy | 384/380 |
| 2,187,626 | 1/1940 | Merriman | 384/285 |
| 3,153,814 | 10/1964 | Ohrnberger | 425/451.6 |
| 3,667,818 | 6/1972 | Adamski et al. | 384/380 |
| 3,932,175 | 1/1976 | Streicher | 420/67 |
| 4,383,478 | 5/1983 | Jones | 16/273 |
| 4,509,803 | 4/1985 | Takenaka et al. | 384/907 |

FOREIGN PATENT DOCUMENTS 137625 7/1985 Japan .................................. 425/451.6

OTHER PUBLICATIONS

Lloyd, Norman M., "Molybdenum Disulfide Uses are Growing", Automotive Industries, Apr. 1, 1962.
Engel Brochure, Lugwig Engel, Canada Ltd., Guelph, Ontario, Canada, pub. date unknown.

Primary Examiner—Jay H. Woo
Assistant Examiner—C. Scott Bushey
Attorney, Agent, or Firm—Armstrong, Nikaido, Marmelstein & Kubovcik

[57] ABSTRACT

In a toggle-type mold-clamping apparatus including at least a pair of swingable arms and toggle pins for connecting the arms in a swingable manner through toggle bushings each of which is constructed of a cylinder element and pellets embedded in a peripheral surface of the cylinder element at intervals of a certain distance so as to be exposed to an inner peripheral surface of the cylinder element, while a lubricant film of a grease mixed with fine particles of solid lubricant is applied to sliding surfaces of the toggle pins and the toggle bushings, resulting in excellent lubrication being realized in the apparatus.

23 Claims, 11 Drawing Sheets

FORWARD POSITION OF TRAVELING DIE PLATE AT COMPLETION OF MOLD-CLAMPING OPERATION

FORWARD POSITION OF CROSS-HEAD AT COMPLETION OF MOLD-CLAMPING OPERATION

MACHINE CENTER-LINE

CONDITION AT COMPLETION OF MOLD-CLAMPING OPERATION

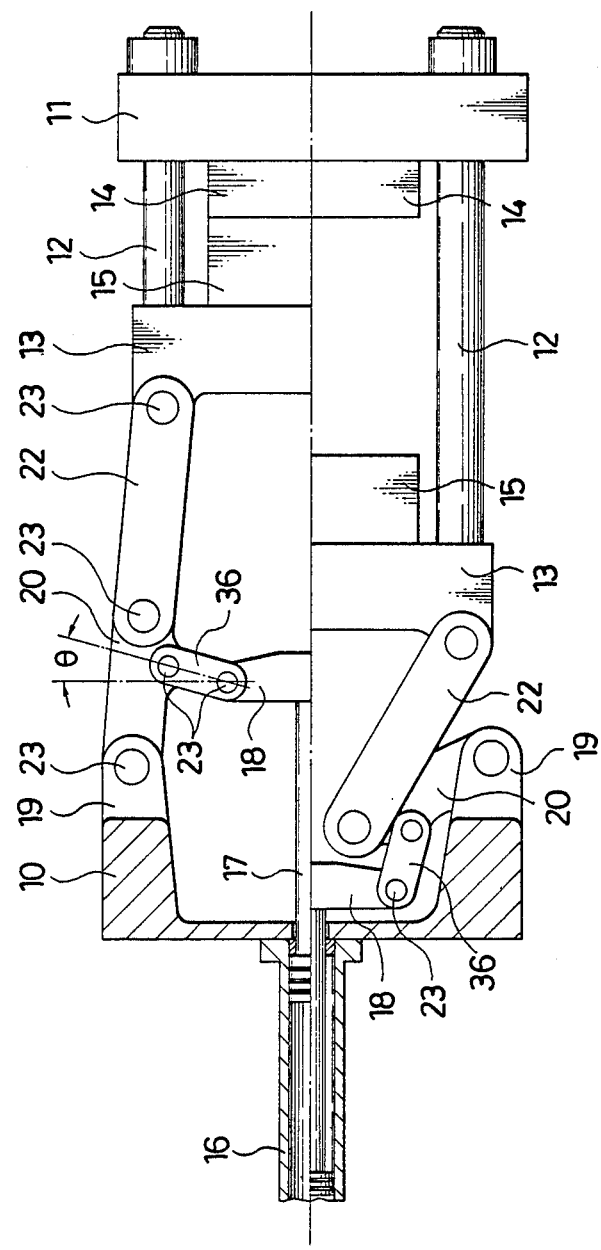

4,773,845

TOGGLE-TYPE MOLD-CLAMPING APPARATUS

BACKGROUND OF THE INVENTION

1. Field of the Invention

The present invention relates to a mold-clamping apparatus employed in, for example such as an injection molding machine and a die-cast machine, and more particularly to a toggle-type mold-clamping apparatus.

2. Description of the Prior Art

In the injection molding machine and the die-cast machine, a toggle-type mold-clamping apparatus has been widely employed due to its high-speed mold-clamping operation with energy-saving manner in comparison with a direct-compression type mold-clamping apparatus.

However, such a toggle-type mold-clamping apparatus suffers from some problems. Namely, the apparatus requires a suitable lubrication in its mechanically slidable parts. Consequently, hitherto, there are various types of proposals as to an automatic lubricator unit, grease-type lubricants and the like. However, none of them is satisfactory in durability so that the conventional apparatus requires a daily oiling service before starting its molding operation, to make the operation cumbersome.

In addition, in the apparatus employing a lubricating oil, an excess amount of the lubricating oil overflowing from sliding parts of the mold-clamping apparatus drops from such parts to pool on a frame of the apparatus, and then adheres to an outlet of a molded-product discharging chute, so that the thus adhered oil deteriorates the molded-product in its appearance. This is a disadvantage inherent in the apparatus.

SUMMARY OF THE INVENTION

It is an object of the present invention to resolve the problems inherent in the prior art described above and to provide a toggle-type mold-clamping apparatus excellent in durability, reliability in addition to a good handling properties.

In order to accomplish the above object of the present invention, there is provided a toggle-type mold-clamping apparatus comprising at least a pair of arms which are swingable relative to each other, and toggle pins for swingably connecting such arms with each other, in which apparatus: toggle bushings are employed each toggle bushing being constructed of: a cylinder element in which is formed an insertion-hole in which the toggle pin is inserted; and a plurality of pellets which are made of solid lubricants and embedded in a peripheral wall portion of the cylinder element at intervals of a certain distance so as to be exposed to an inner peripheral surface of the cylinder element.

The toggle bushing is fixed to the insertion-hole of the arm in a suitable manner, for example such as a press-fitting manner and the like, for receiving the toggle pin therein. Then, the toggle pin is inserted in a bore of the toggle bushing, while a lubricant-film constructed of a grease mixed with fine particles of the solid lubricant is interposed between sliding surface of the toggle pin and that of the toggle bushing.

BRIEF DESCRIPTION OF THE DRAWINGS

FIG. 10 (b) is a plan view schematically illustrating the toggle;

FIG. 10 (c) is a plan view of the toggle linkage at which the mold-closing operation is completed;

FIG. 11 is a partially sectional plan view of the toggle-type mold-clamping apparatus of the second embodiment of the present invention;

DESCRIPTION OF THE PREFERRED EMBODIMENTS

Hereinbelow, a toggle-type mold-clamping apparatus of a first embodiment of the present invention will be described with reference to the drawings.

Figure 1:
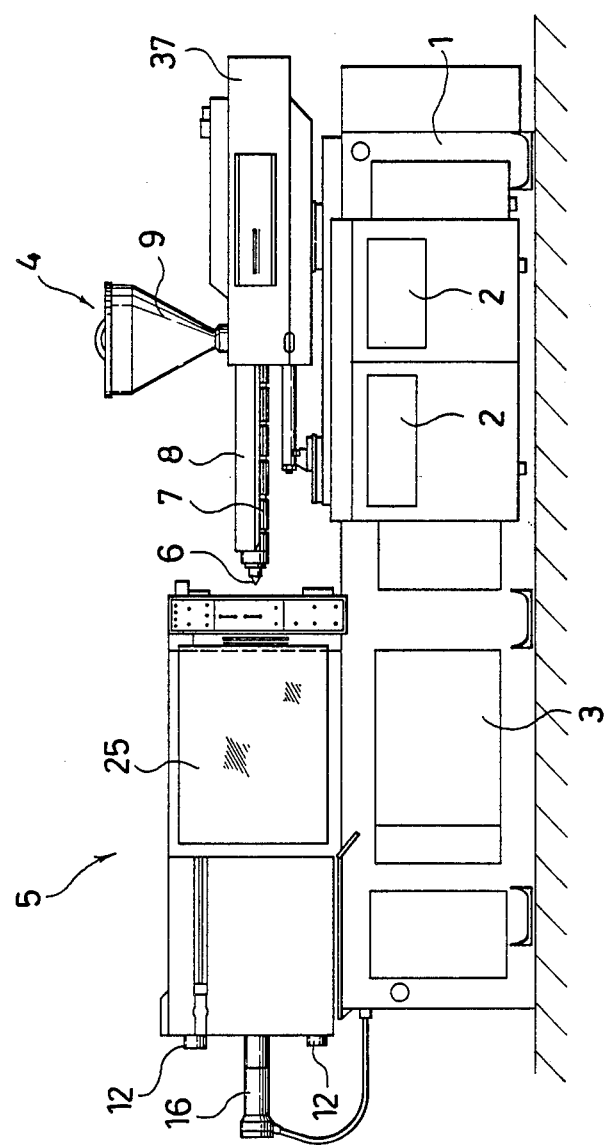
FIG. 1 is a front view of an injection molding machine provided with a toggle-type mold-clamping apparatus of the present invention.

In FIG. 1, 1 is a base portion of an injection molding machine in which the toggle-type mold-clamping apparatus is employed. There are provided a control/display portion 2 in a right-hand side of the base portion 1 in FIG. 1 and a molded-product discharging chute 3 in a left-hand side of the base portion 1 in FIG. 1, respectively. In an upper right-hand side of the base portion 1 is provided an injection unit 4. In an upper left-hand side of the base portion 1 is provided a mold-clamping unit 5. As shown in FIG. 1, the injection molding unit 4 is provided with; a heating cylinder 8 having a nozzle portion 6 in its front end and wound in its outer periphery by a band-heater 7; a material-feed hopper 9; and a screw-drive portion 37 for driving an extruder-screw (not shown) inserted in the heating cylinder 8.

Now, the construction of the toggle-type mold-clamping apparatus 5 of the first embodiment of the present invention will be described with reference to FIGS. 1 to 8.

Figure 2:
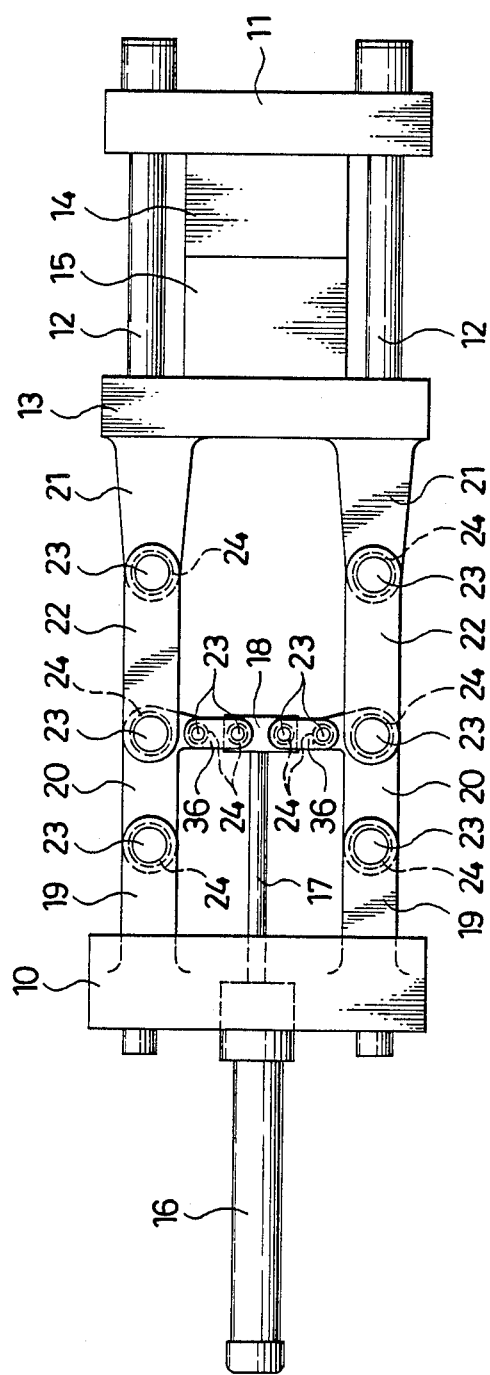
FIG. 2 is a plan view of the toggle-type mold-clamping apparatus of the first embodiment of the present invention.
Figure 3:
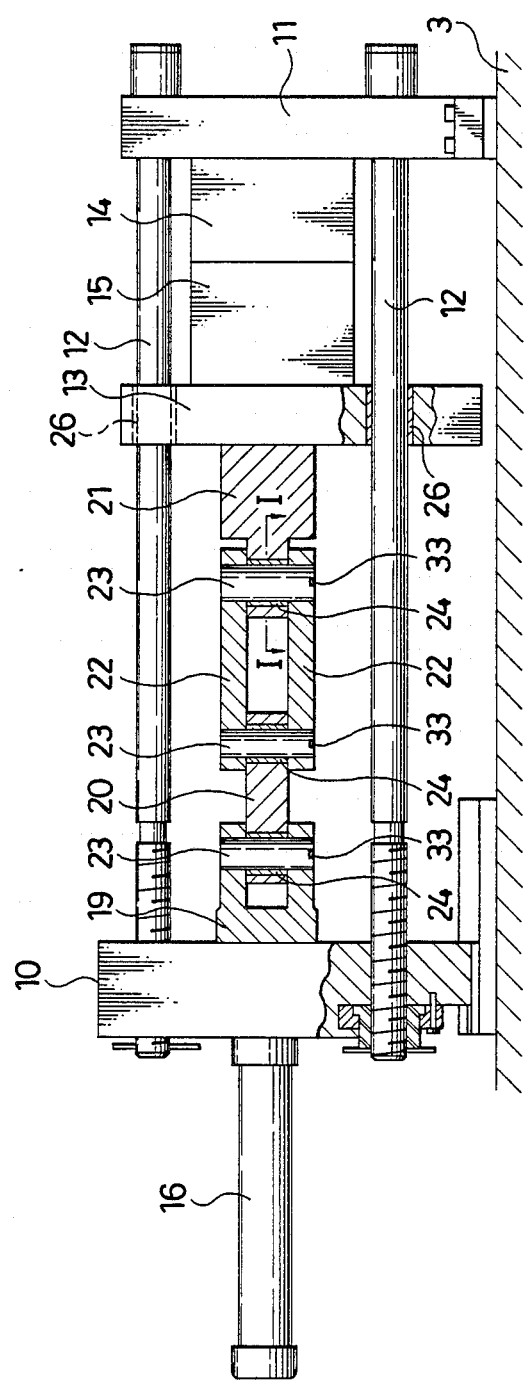
FIG. 3 is a partially broken front view of the toggle-type mold-clamping apparatus of the first embodiment of the present invention.

As shown in FIGS. 2 and 3, in the apparatus 5, four tie bars 12 are mounted beween a tail stock 10 and a stationary die plate 11 and equally spaced apart from each other with predetermined intervals. These four tie bars 12 act as bars for guiding a movable die plate 13 relative to a stationary die plate 11, which movable die plate 13 is movably disposed in the apparatus 5. A stationary mold half 14 is fixed to the stationary die plate 11, while movable mold half 15 is fixed to the movable die plate 13 so that the movable mold half 15 is brought into a disengageble contact with the stationary mold half 14.

A mold opening/closing operation is conducted by means of a hydraulic cylinder 16 and a toggle mechanism provided between the hydraulic cylinder 16 and the movable die plate 13. As shown in FIG. 2, such toggle mechanism is substantially constructed of: a cross-head arm 18 fixed to a piston rod 17 of the hydraulic cylinder 16, a first fixed arm 19 provided in the tail stock 10 in a projecting manner; a first swingable arm 20 connected with the first fixed arm 19; a second fixed arm 21 provided in the movable die plate 13 in a projecting manner; a second swingable arm 22 for connecting the second fixed arm 21 to the first swingable arm 20; a third swingable arm 36 for connecting the cross-head arm 18 to the first swingable arm 20; and toggle pin 23 for connecting these arms 18, 19, 20, 21, 22 (hereinafter referred to "the arms 18 to 22") and the arm 36.

For example, as shown in FIG. 3, in connecting: the first fixed arm 19 to the first swingable arm 20; the first swingable arm 20 to the second swingable arm 22; and the second swingable arm 22 to the second fixed arm 21, respectively, through-holes each of which is larger than the toggle pin 23 in diameter are provided in the insertion-portions of one of the arms to be connected to each other, i.e., of the first swingable arm 20 and the second fixed arm 21 in the first embodiment shown in FIG. 3, in which insertion portion for receiving the toggle pin 23 therein is provided the through-hole an inner diameter of which is slightly smaller than an outer diameter of the cylindrical toggle bushing 24 which is inserted into the through-hole and press-fitted thereto.

In insertion, the toggle bushings 24 are cooled and contracted by the use of a refrigeration medium such as liquid nitrogen, and then, under such circumstances, the toggle bushings 24 are inserted into the through-holes of the arms 20, 21 and 36 to allow the toggle bushings 24 to stand at room temperature, so that the toggle bushings 24 are firmly fixed to the arms 20, 21 and 36 in their through-holes.

As shown in FIG. 2, both the toggle pin 23 and the toggle bushings 24 employed in the connecting portions of the cross-head arm 18 and the third swingable arm 36 are relatively small in diameter, while those 23, 24 employed in the connecting portions of the first fixed arm 19, first swingable arm 20, second fixed arm 21 and the second swingable arm 22 are relatively large in diameter.

FIGS. 2 and 3 show a condition in which the mold halves 14, 15 are clamped, in which condition the hydraulic cylinder 16 is stretched out so that any of the arms 18 to 22 are stretched relative to each other. When a piston rod 17 of the hydraulic cylinder 16 is retracted, the third swingable arm 36, first swingable arm 20 and the second swingable arm 22 are swung relative to each other, whereby the movable die plate 13 with the movable mold half 15 is separated from the stationary die plate 11 with the stationary mold 14 to open the mold.

Incidentally, 25 in FIG. 1 is a safety cover; and 26 in FIG. 3 a tie-bar bushing fixed to the movable die plate 13 in its tie-bar insertion portion, which bushing 26 has the same construction as that of the toggle bushing 24 described later. Although not shown in the drawings, an ejector means for ejecting the molded-product from the movable mold half 15 is provided in this toggle-type mold-clamping apparatus 5, which ejector means is actuated by a hydraulic cylinder.

The outline in construction of the toggle-type mold-clamping apparatus of the first embodiment of the present invention is as described in the above. Now, materials of the constituent parts of the mold-clamping apparatus 5 will be described in detail.

First, each of the arms 18 to 22 is made of, for example such as a cast iron and a steel having a brinell hardness number (HB) of approximately 165 to 200. In case that the cast iron is employed as the material of these arms 18 to 22, such cast iron must be free from flaws and cavities.

Figure 4:
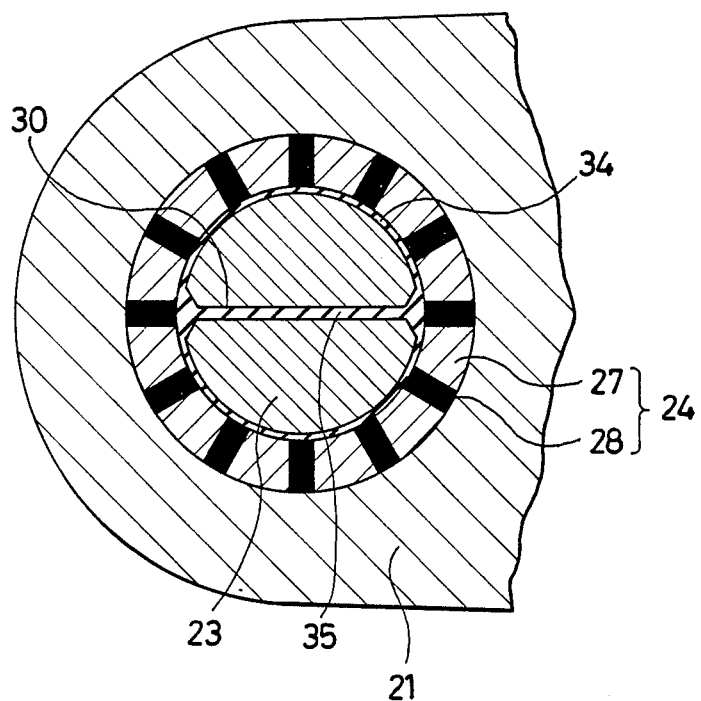
FIG. 4 is a cross-sectional view taken along the line I—I of FIG. 3.
Figure 5:
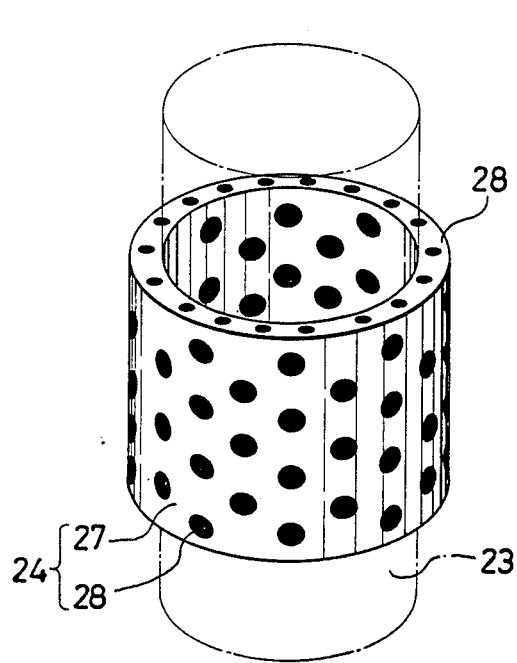
FIG. 5 is a perspective view of the toggle bushing.

As shown in FIGS. 4 and 5, the toggle bushing 24 is constructed of: a cylinder element 27 having an insertion bore in which the toggle pin 23 is inserted; and a plurality of pellets 28 embedded in an inner peripheral surface of the cylinder element 27 at intervals of a predetermined distance so as to be exposed to the inner peripheral surface of the cylinder element 27, which pellets 28 are embedded also in an upper and lower end surfaces of the cylinder element 27 so as to be exposed to these end surfaces.

The cylinder element 27 is made of, for example such as a special copper alloy and the like. The pellet 28 is made of, for example such as graphite, molybdenum disulfide, an inorganic substance such as a mixture of graphite and molybdenum disulfide, or an organic solid lubricant such as polytetrafluoroethylene and ultra-high-molecular-weight polyethylene. In the cylinder element 27 of the toggle bushing 24 are formed the insertion small bores and cavities both of which are provided in predetermined positions of the cylinder element 27, so that the pellets 28 are embedded in the small bores and cavities. After embedding of the pellets 28 in the small bores and cavities of the cylinder element 27, the cylinder element 27 is ground in its inner peripheral surface and upper and lower end surfaces all of which surfaces form sliding surfaces, to provide a surface roughness of up to 3S (3/1000 mm) in these surfaces thereof.

A ratio of the total area of the exposed surfaces of the pellets 28 to the total area of the sliding surfaces of the toggle bushing 24 is preferably within a range of from about 20 to 40%. In case that such ratio is within the above range, there is no fear of an extreme deterioration in mechanical strength of the cylinder element 27, and an excellent lubricating effect can be obtained.

Figure 6:
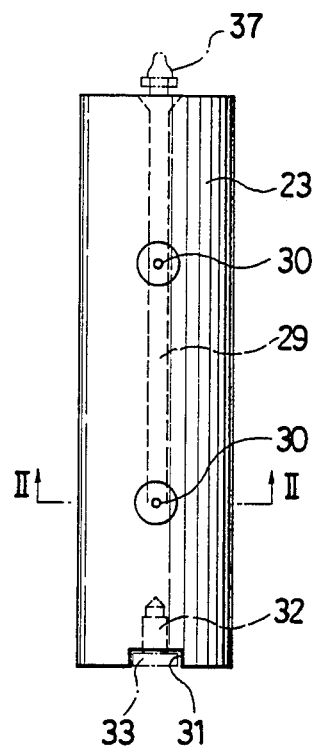
FIG. 6 is a front view of the toggle pin.

As shown in FIG. 6, the toggle pin 23 is provided with: an axial oil-feed hole 29 extending halfway from a substantially central portion of the upper end surface of the toggle pin 23; and a radial oil-feed hole 30 which extends radially to communicate with the axial oil-feed hole 29 and to open in a peripheral surface of the toggle pin 23, so that a divergent opening of the radial oil-feed hole 30 is formed in the peripheral surface of the toggle pin 23.

Figure 7:
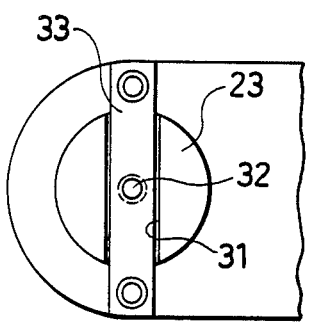
FIG. 7 is a bottom view of the toggle pin and the arm.
Figure 8:
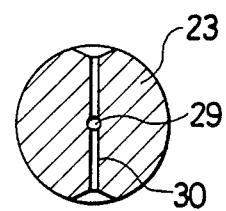
FIG. 8 is a cross-sectional view taken along the line II—II of FIG. 6.

As shown in FIGS. 6 and 7, in the toggle pin 23, there are formed: an elongated groove 31 radially extending across the end surface of the toggle pin 23; and a threaded hole 32. In the elongated groove 31 is inserted a connecting piece 33 which is screwed on the toggle pin 23 in its intermediate portion and further screwed on predetermined portions of the arms 19, 22 and 36 in its opposite ends, so that the toggle pin 23 is prevented from rotating relative to the arms 19, 22 and 36. 37 in FIG. 6 is a grease-feed nipple described later.

The toggle pin 23 is made of, for example such as chrome-molybdenum steel such as SCM 415 and the like, and is subjected to a carburization/quenching treatment in its depth of approximately 1.2 mm, and then subjected to abrasion treatment and a hard chromium plating treatment to have rust-resisting properties. The thus treated toggle pin 23 is eventually subjected to an abrasive finishing treatment to have a surface roughness of up to 3S (3/1000 mm).

As described above, the plating treatment for giving the toggle pin 23 the rust-resisting properties is very important, because, if the rust occurs in the toggle pin 23 in operation of the mold-clamping apparatus 5, such rust leads to abnormal friction produced between the toggle pin 23 and the toggle bushing 24, which friction leads to abnormal abrasions of the toggle bushing 24.

In addition, it is also very important to restrict the surface roughness of the sliding surfaces of the toggle pin 23 and the toggle bushing 24. When both the toggle pin 23 and the toggle bushing 24 are subjected to the abrasive finishing treatments to provide the surface roughness of up to 3S (3/1000 mm), respectively, it is possible to reduce a surface-friction coefficient of each of the toggle pin 23 and the toggle bushing 24, so that abrasions thereof can be reduced.

As shown in FIG. 4, a lubricant film 34 is interposed between the sliding surfaces of the toggle pin 23 and the toggle bushing 24. The lubricant film 34 is made of a grease mixed with fine particles of a solid lubricant, for example such as molybdenum disulfide, graphite, polytetrafluoroethylene or the like. Such solid lubricant takes a form of fine particles an average-particle size of which is approximately 1 $\mu$m. Such solid lubricant is added to the grease by an amount of about 5 to 20 wt. %. Such addition of the fine particles of the solid lubricant to the grease contributes to improvements in lubricating properties, load-resisting properties and the like properties of the lubricant film 34. The grease employed in the lubricant film 34 may be, for example, one of calcium-soap greases. Such grease is mixed with a predetermined amount of the fine particles of the solid lubricant to be adjusted in its consistency to a grade of #0 to #2 in use.

Prior to a virgin operation of the mold-clamping apparatus 5, a grease mixed with the fine particles of the solid lubricant described above is filled in the axial oil-feed hole 29 and the radial oil-feed hole 30, so that the thus filled grease 35 incorporates with the lubricant film 34.

In the toggle bushing 24 employed according to the present invention, since a plurality of the pellets 28 made of the solid lubricant are embedded in the inner peripheral surface of the toggle bushing 24 so as to be exposed to the inner peripheral surface, the solid lubricant can be gradually scraped from the exposed surfaces, i.e., sliding surfaces of the pellets 28 in a finely granulating manner when the toggle pin 23 slides relative to the toggle bushing 24. The thus scraped solid lubricant forms the lubricant film 34 between the toggle pin 23 and the toggle bushing 24 and contributes to the improvement of lubrication between the toggle pin 23 and the toggle bushing 24.

By the use of the toggle bushing 24, it is possible to eliminate a daily oiling service of the toggle mechanism in contrast with the conventional mold-clamping apparatus, so that the maintenance service of the apparatus 5 of the present invention can be simplified. In addition, in the apparatus of the present invention, a lubricating oil is not employed, so that there is no fear that the lubricating oil overflows and adheres to the molded product to dirty the same.

In the toggle-type mold-clamping apparatus 5 of the present invention, since the surface pressure between the toggle pin 23 and the toggle bushing 24 is in a range of, for example, 1200 to 1300 Kg/cm$^2$ which is a very high surface pressure, so that, if there is no lubricant film 34 made of mainly grease in the sliding surfaces of the toggle pin 23 and the toggle bushing 24, nicks are produced in portions of the pellets 28, which portions are adjacent to the toggle pins 23 at a time when the number of times of the mold opening/closing operation cycle reaches to approximately 300$\times$10$^4$. In case that such nicks are produced, the nicks causes the cylinder element 27 to be nicked in its edge portions adjacent to the nicks of the pellets 28. As a result, an inner surface layer of the toggle bushing 24 eventually begins to collapse. When the thus produced nicked pieces of the cylinder element 27 and the pellets 28 are interposed between the toggle pin 23 and the toggle bushing 24, the toggle pin 23 begins to be abnormally abraded. Such abnormal abrasion must be prevented from occurring.

Figure 9:
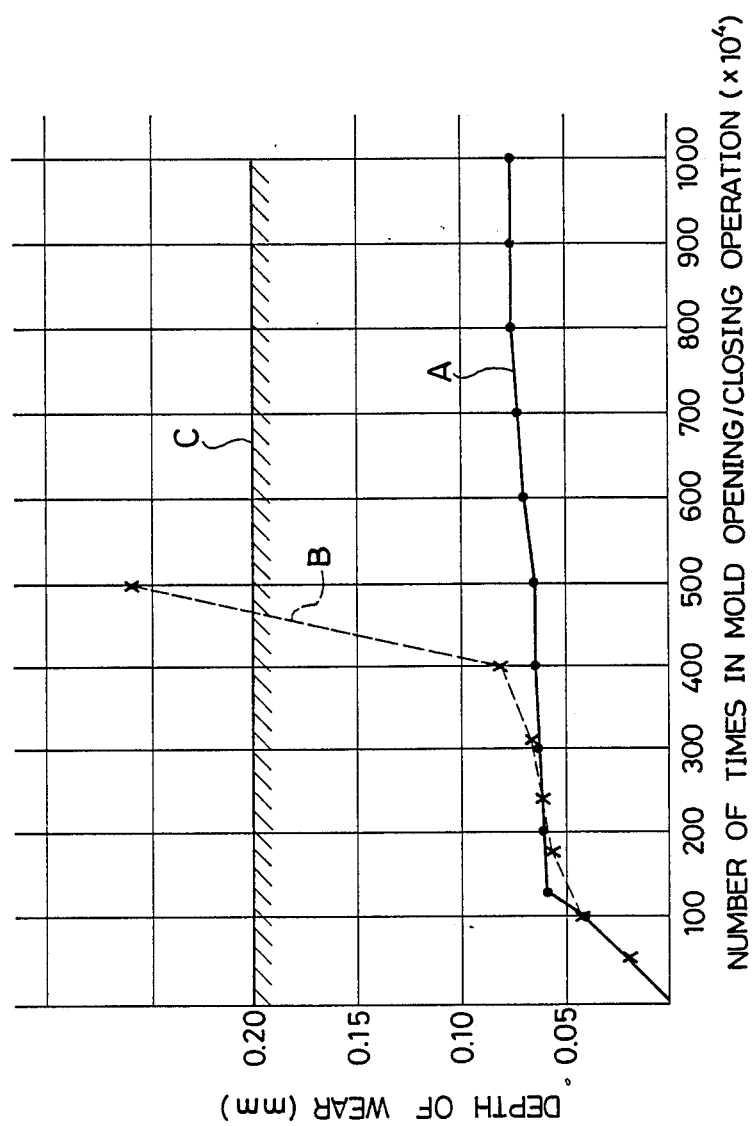
FIG. 9 is a diagram illustrating the amount of abrasion of toggle bushing relative to the number of times of the mold opening/closing operation.

FIG. 9 is a diagram illustrating the depth of abrasion of toggle bushing relative to the number of times of the mold opening/closing operation cycle, in which: a graph "A" represents the amount of abrasion of the toggle bushing 24 brought into a slidable contact with the toggle pin 23 through the lubricant film 34 made of the grease mixed with the fine particles of the solid lubricant; and a graph "B" represents the amount of abrasion of the toggle bushing 24 brought into a slidable contact with the toggle pin 23 without interposing the lubricant film 34 between the toggle bushing 24 and the toggle pin 23. Incidentally, a graph "C" shown in FIG. 9 represents an upper limit of an abrasion allowance of the toggle bushing 24 to keep a stable operation of the mold-clamping apparatus 5 of the present invention.

As is clear from FIG. 9, in case that the lubricant film 34 made of mainly grease is not interposed between the toggle bushing 24 and the toggle pin 23, the amount of abrasion of the toggle bushing 24 extremely increases when the mold opening/closing operation cycle is repeated 400$\times$10$^4$ or more times as shown in the graph "B", and the amount of abrasion of the toggle bushing 24 is more than the upper limit "C" of the wear allowance of the toggle bushing 24 at 500$\times$10$^4$ times in the diagram shown in FIG. 9. In contrast with this, in case of the mold-clamping apparatus 5 of the present invention, as shown in the graph "A", the amount of abrasion of the toggle bushing 24 substantially does not vary relative to the number of times of the mold opening/closing operation cycle. Even when the mold opening/closing operation is repeated more than 1000$\times$10$^4$ times, the amount of abrasion of the toggle bushing 24 stays below 0.10 mm, so that it is found that the mold-clamping apparatus 5 of the present invention can hold its excellent abrasion-resisting properties over prolonged periods.

In addition, it is possible to enhance the load-resisting properties of the grease by mixing the grease with a small quantity of the fine particles of the solid lubricant, so that the lubricant film 34 mainly made of the thus prepared grease can perform a sufficient lubricating function in the sliding surfaces of the toggle pin 23 and the toggle bushing 24 over prolonged period. Consequently, the provision of such lubricant film 34 between the toggle pin 23 and the toggle bushing 24 allows the grease-feed service to be conducted at intervals of, for example such as six months. Therefore, the mold-clamping apparatus 5 of the present invention is preferable also in view of its maintenance service.

Figure 10A:
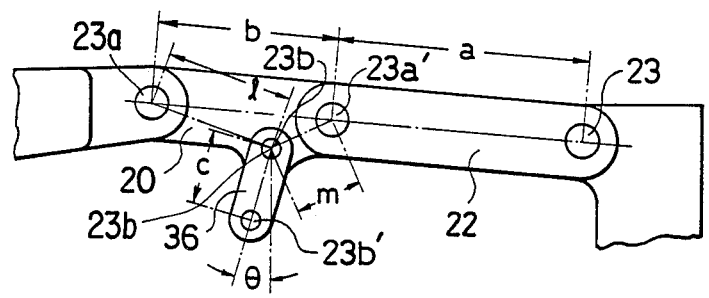
FIG. 10 (a) is a partially enlarged plan view of the toggle mechanism.
Figure 10B:
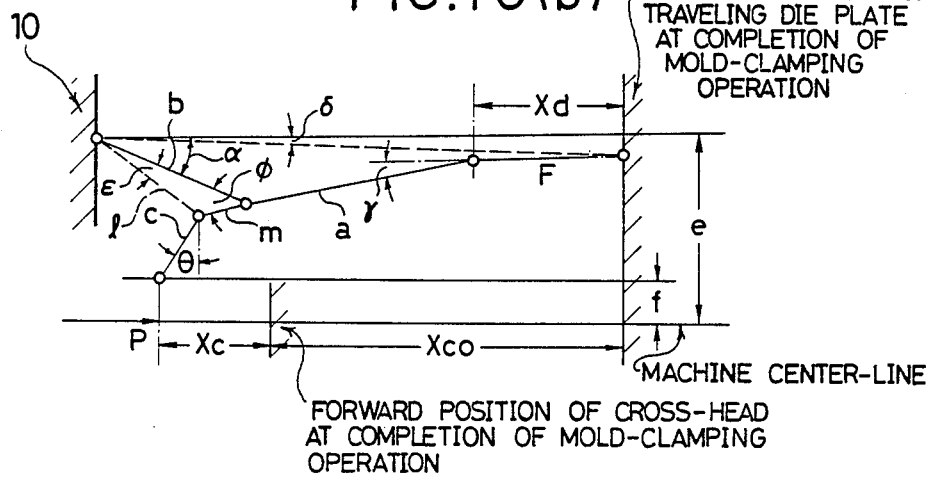
Figure 10C:
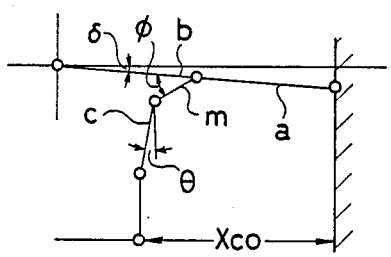

FIGS. 10 (a), 10 (b) and 10 (c) are views for theoretically illustrating the principle of the toggle-type mold-clamping apparatus 5 of the present invention, which principle will be hereinbelow described with the use of: a stroke Xc of the mold-clamping cylinder 16; a stroke Xd of the movable die plate 13; and a toggle-magnifying ratio.

In the drawings: the reference character "a" denotes a length of the second swingable arm 22 between the centers of the toggle pins $23a'$ and 23; "b" a length of the first swingable arm 20 between the centers of the toggle pins $23a$ and $23a'$; "c" a length of the third swingable arm 36 between the centers of the toggle pins $23b$ and $23b'$; "l" a length of the first swingable arm 20 between the centers of the toggle pins $23a$ and $23b$; "m" a length of the first swingable arm 20 between the centers of the toggle pins $23b$ and $23a'$; "e" and "f" lengths indicated in FIG. 10 (b); "$\phi$" an angle included between sides b and m; "$\epsilon$" an angle included between sides b and l; "$\delta$" an angle included between the center line of the machine and an axial line of the first swingable arm 20 after completion of the mold-closing operation; "$\theta$" an angle included between an axial line of the third swingable arm 36 and a line perpendicular to the center line of the machine after completion of the mold-closing operation; "$\alpha$" an angle included between the axial line of the first swingable arm 20 and the center line of the machine; "$\gamma$" an angle included between the axial line of the second swingable arm 22 and the center line of the machine; "Xco" a distance between a forward position of the cross-head 18 and a forward position of the movable die plate 13 after completion of the mold closing operation; "Xd" a stroke of the movable die plate 13, measured from the origin, i.e., a position at which the mold closing operation is completed (hereinafter referred to as the closing-completion position); "Xc" a stroke of the mold-clamping cylinder 16, measured from the forward position of the cross-head 18 at a time when the mold closing operation is completed; "F" a mold-clamping force; "P" a thrust generated by the mold-clamping cylinder 16; and "F/P" a toggle-magnifying ratio, where:

$$Xd = (a+b)\cdot\cos\delta - b\cdot\cos\alpha - a\cdot\cos\gamma \quad (1)$$

provided that: the angle "$\gamma$" can be calculated from $$\sin\gamma = \frac{b\cdot\sin\alpha - (a+b)\cdot\sin\delta}{a} ; \quad (2)$$

$$Xc = (a+b)\cdot\cos\delta - l\cdot\cos(\alpha+\epsilon) + c\cdot\sin\theta - Xco$$

where: the angle "$\theta$" can be calculated from:

$$\cos\theta = \frac{e - f - l\cdot\sin(\alpha+\epsilon)}{c} ;$$

the distance "Xco" can be calculated from:

$$Xco = a\cdot\cos\delta + m\cdot\cos(\phi-\delta) + c\cdot\cos\theta;$$

the length "l" can be calculated from:

$$l = \sqrt{(b - m\cdot\cos\phi)^2 + (m\cdot\sin\phi)^2} ; \text{ and}$$

the toggle-magnifying ratio "F/P" can be calculated from:

$$F/P = \frac{l\cdot\cos\gamma\cdot\cos(\alpha+\epsilon-\theta)}{b\cdot\sin\theta\cdot\sin(\alpha+\gamma)} \quad (3)$$

Figure 12:
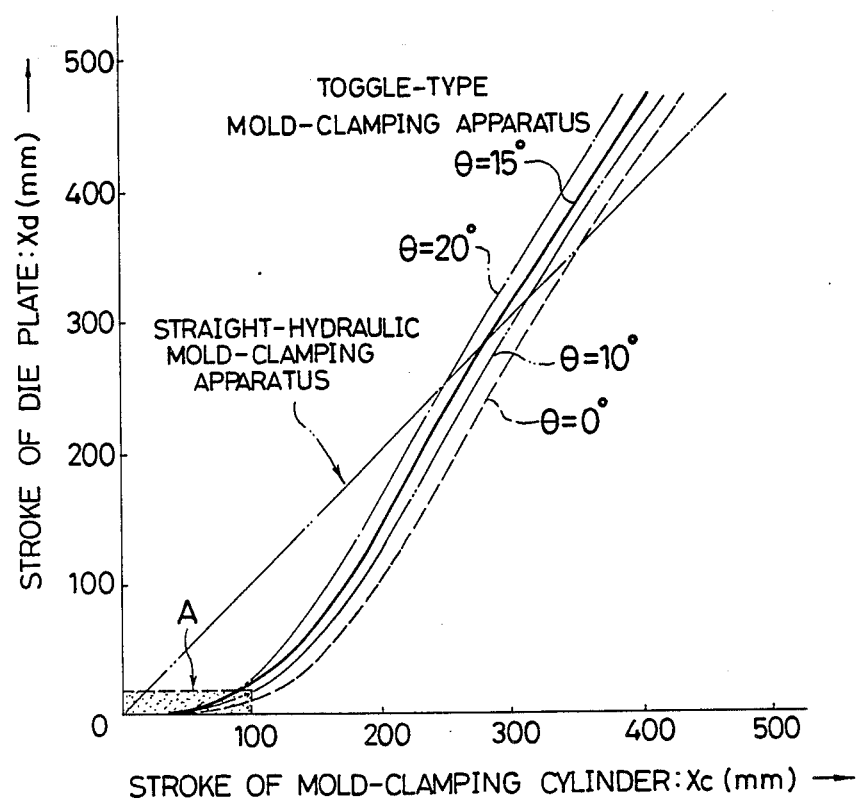
FIG. 12 is a diagram illustrating the relationship between the stroke of the mold-clamping cylinder and that of the movable die plate.

FIG. 12 is a diagram illustrating the relationships between the thus calculated theoretical values of the stroke Xc of the mold-clamping cylinder 16 and the stroke Xd of the movable die plate 13, in which diagram the origin "O" represents a position at which the mold closing operation is completed, which position is hereinafter referred to as the closing-completion position. The movable mold half 15 fixed to the movable die plate 13 begins to move from such closing-completion position i.e., the origin "O" in its opening operation so that the mold (15, 14) is gradually opened. At this time, as is clear from FIG. 10 (b), the angle "$\alpha$" gradually increases from the angle "$\alpha$" which is a starting angle of the angle "$\alpha$" at a time when the mold closing operation is completed. At this time, the stroke Xd of the movable die plate 13 calculated from the above equation (1) is plotted on the ordinate axis, while the stroke Xc of the mold-clamping cylinder 16 calculated from the above equation (2) is plotted on the abscissa axis of the cartesian coordinate system to obtain the diagram shown in FIG. 12 wherein: a two-dot chain line which is straight represents the relationship between the Xc and the Xd of a straight-hydraulic mold-clamping apparatus.

As is clear from FIG. 12, in case of the toggle-type mold-clamping apparatus, the stroke Xd of the movable die plate 13 varies slightly in the vicinity of the origin "O", i.e., the closing-completion position. However, when the mold opening operation further proceeds, the variation of the stroke Xd rapidly increases, so that the toggle-type mold-clamping apparatus is ideal in protection of the mold and the molded product and also in speed-control of the mold opening/closing operation of the apparatus.

However, in such ideal toggle-type mold-clamping apparatus, there is some problems in that: in order to obtain a certain length of the stroke Xd of the movable die plate 13, the stroke Xc of the mold-clamping cylinder 16 must be long, that is, the toggle-type mold-clamping apparatus must be a large-sized apparatus which requires a long mold-opening/closing cycle time to lower the productivity rate.

Figure 13:
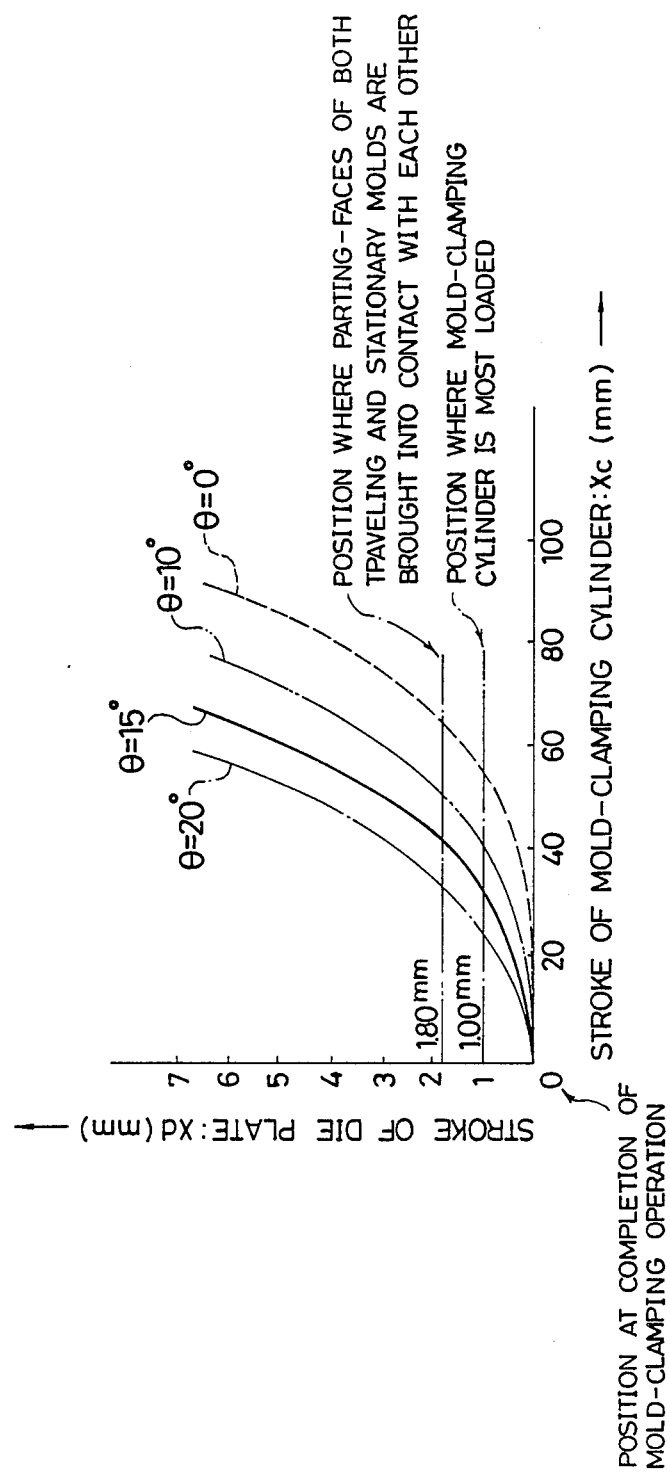
FIG. 13 is an enlarged diagram illustrating the relationship between the stroke of the mold-clamping cylinder and that of the movable die plate in the vicinity of the origin, i.e., the position at which the mold-closing operation is completed.

In addition, as is clear from the enlarged view of the vicinity of the origin, i.e., the closing-completion position shown in FIG. 13, in the toggle-type mold-clamping apparatus in which the angle "$\theta$" is 0°, it is necessary that the stroke Xc between a position where the mold-clamping cylinder 16 is most loaded and the origin "O", i.e., the closing-completion position of the mold is long. For example, according to the diagram shown in FIG. 13, such stroke Xc is about 55 mm long. In addition, in this case, the thrust speed of the mold-clamping cylinder 16 decreases in the vicinity of the position where the mold-clamping cylinder is most loaded. When the movable die plate 13 passes through such position, the speed of the movable die plate 13 increases again, so that an uneven operation of the movable die plate 13 is produced. The above-mentioned problems are inherent in the first embodiment of the present invention shown in FIG. 2.

Figure 14:
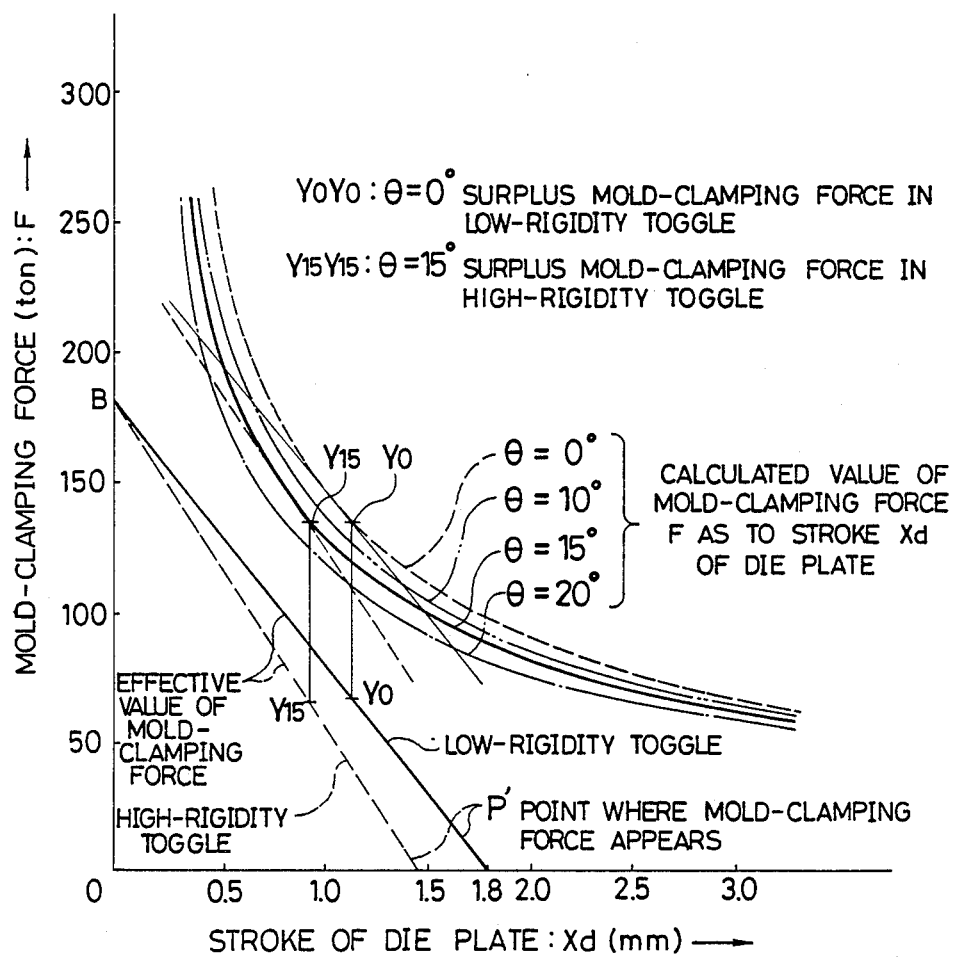
FIG. 14 is a diagram illustrating the surplus mold-clamping force.

FIG. 14 is a diagram illustrating the relationship between the stroke Xd of the movable die plate 13 and the mold-clamping force F, in which diagram the stroke Xd of the movable die plate 13 is plotted on the abscissa axis, while the mold-clamping force F is calculated from the above equation (3) in case that an injection molding machine having a 180-ton thrust capacity is employed in operation, and the thus obtained result F is plotted on the ordinate axis in FIG. 14. As is clear from FIG. 14, the toggle-magnifying ratio "F/P" rapidly increases as the movable die plate 13 moves to the origin "O". Such rapid increase of the "F/P" means a rapid increase of the mold-clamping force F applied to the movable die plate 13.

Also in FIG. 14, a dotted line and a solid line both of which are straight and thick are graphs showing a value of the mold-clamping force F actually measured by means of a strain gauge attached to the tie bar 12. According to experimental results, it is found that: generally, in the toggle-type mold-clamping apparatus 5 of this class, the parting surface of the movable mold half 15 and the stationary mold half 14 are brought into contact with each other in a position backing by approximately 2 mm from the closing-completion position, i.e., the origin "O" in the diagram shown in FIG. 14, so that the tie bars 12 are extended to produce the mold-clamping force as a result of a reaction to such extension of the tie bars 12. However, the thus produced mold-clamping force F is not a counterforce itself against the extension of the tie bars 12, but a force depend-on the overall rigidity of the entire toggle mechanism, which rigidity depends on deformations produced in the mold clamping operating, for example such as: deflections of the movable die plate 13 and the stationary die plate 11; compressive strains of the toggle linkage and the mold halves 14, 15; the extension of the tie bars 12; and the like deformations of the constituent parts of the apparatus 5.

In the graphs of the actually measured values shown in FIG. 14, it is found that the mold-clamping force F is produced in a position backing by 1.8 mm from the closing-completion position of the mold, i.e., the origin "O". Although the numerical value such as 1.8 mm described above varies according to the overall rigidity of the entire toggle mechanism, it is generally found that such numerical value is within a range of from about 2.5 to about 3.0 times the extension of the tie bar 12. Such multiplying ratio is termed "clamping-amplification coefficient". In the latest molding machine, since a high-precision molding is required, the rigidity of the toggle mechanism is increased to extremely decrease the deflection of the same. As a result, such clamping-amplification coefficient tends to decrease, so that the linear graph of the resultant mold-clamping force F is steep in its inclination.

As shown in FIG. 14, minimum difference in ordinate between the upper graphs of the calculated value of the mold-clamping force F for driving the movable die plate 13 and the lower graphs of the effective value of the mold-clamping force F actually measured represent the surplus mold-clamping forces. It is very important in designing the toggle-type mold-clamping apparatus 5 to obtain a sufficient amount of such surplus mold-clamping force F.

In view of the above considerations, a second embodiment of the toggle-type mold-clamping apparatus of the present invention shown in FIG. 11 is provided. In an upper-half of FIG. 11 is shown a condition of the apparatus, in which the mold closing operation is completed. In a lower-half of FIG. 11 is shown a condition of the apparaus, in which the mold opening operation is completed.

The second embodiment of the present invention shown in FIG. 11 is similar in essential construction to the first embodiment of the present invention shown in FIG. 2, provided that the second embodiment shown in FIG. 11 differs from the first embodiment shown in FIG. 2 in that: in the first embodiment shown in FIG. 2, a straight line passing through the toggle pins 23 of the third swingable arm 36 is perpendicular to the moving direction of the movable die plate 13, i.e., the angle "$\theta$" is 0° after completion of the mold closing operation; whereas, in the second embodiment shown in FIG. 11, the angle "$\theta$" is not 0° but in a range of 10° to 20° after completion of the mold closing operation, based on the following reasons.

As shown in FIG. 12, when the angle "$\theta$" is increased, the stroke Xd of the movable die plate 13 increases at the same absissa position (Xc), to make it possible to decrease a necessary stroke of the mold-clamping cylinder 16 for conducting the mold clamping operation. This is an advantage of the second embodiment shown in FIG. 11. On the other hand, in the latest molding machine, the rigidity of the die plate is increased so as to decrease the deflection thereof to the lowest possible level, so that the clamping-amplification coefficient which is previously about 3.0 decreases now to about 2.5. As a result, the linear graph of the resultant mold-clamping force F has a steep inclination, whereby, as shown in FIG. 14, the occurrence point "P" of the mold-clamping force F moves leftward in the diagram shown in FIG. 14.

On the other hand, in the first embodiment of the toggle-type mold-clamping apparatus 5 of the present invention shown in FIG. 2 in which the angle "$\theta$" is 0° at a time when the mold closing operation is completed, the surplus mold-clamping force shown in FIG. 14 increases to make it possible to reduce the diameter of the mold-clamping cylinder 16 so that it is possible to decrease a necessary thrust of the mold-clamping cylinder 16. However, it is not possible to decrease the stroke Xc of the mold-clamping cylinder between the position where the mold-clamping cylinder is most loaded and the position where the mold closing operation is completed, i.e., the closing-completion position indicated by the origin "O".

Consequently, in the second embodiment of the toggle-type mold-clamping apparatus of the present invention shown in FIG. 11, it is found that the surplus mold-clamping force F shown in FIG. 14 substantially does not vary even when the angle "$\theta$" is not 0° but a small angle in a condition that the mold closing operation is completed. On the basis of this finding, in the second embodiment of the toggle-type mold-clamping apparatus of the present invention shown in FIG. 11, the angle "$\theta$" is in a range of from 10° to 20° in a condition that the mold closing operation is completed. In fact, as shown in FIG. 14, "$Y_0Y_0$" representing a surplus mold-clamping force F in a graph of "$\theta$"=0° is substantially equal in length to "$Y_{15}Y_{15}$" representing a surplus mold-clamping force F in a graph of "$\theta$"=15°.

As a result, as is clear from FIGS. 12 and 13, the ratio of the stroke Xd of the movable die plate 13 to the stroke Xc of the mold-clamping cylinder 16, i.e., the ratio of "Xd/Xc" is increased, and the position where the mold-clamping cylinder 16 is most loaded is moved to the origin "O", i.e., the position where the mold closing operation is completed, so that a distance between such most-loaded position and the origin "O" is shortened. As a result, the mold opening/closing operation can be conducted at a high speed with more even condition.

However, it is preferable that the angle "θ" is in a range of from 10° to 20° at a time when the mold closing operation is completed, since there is a fear that a lack of the surplus mold-clamping force appears in case that the angle "θ" is larger than 20°.

In this second embodiment of the toggle-type mold-clamping apparatus of the present invention, also employed is the toggle bushing 24 provided with the cylinder element 27 in the peripheral-wall portions of which element 27 are embedded at intervals of a predetermined distance a plurality of the solid-lubricant pellets 28. The toggle bushings 24 are fixed to the arms 18, 20 and 21 in their through-holes. The solid lubricant film 34 made of the grease mixed with the fine particles of the solid lubricant is applied to the sliding area between the toggle pin 23 and the toggle bushing 24. Consequently, the second embodiment of the present invention shown in FIG. 11 is constructed in the substantially same manner as that of the first embodiment of the present invention shown in FIG. 2, with regard to the above members.

As described in the above, according to the present invention, in the toggle-type mold-clamping apparatus comprising at least a pair of arms being swingable relative to each other, and toggle pins for swingably connecting such arms with each other, the improvement wherein: toggle bushings are employed each of which toggle bushings is constructed of a cylinder element and a plurality of pellets, in which cylinder element are formed an insertion-hole for receiving the toggle pin, which pellets are made of solid lubricants and embedded in a peripheral wall portion of the cylinder element at intervals of a predetermined distance so as to be exposed to an inner peripheral surface of the cylinder element, which toggle bushings are fixed to toggle-pin inserting portions of the arms so that toggle pins are inserted into the insertion-holes of the toggle bushings, while a lubricant film made of a grease mixed with fine particles of a solid lubricant is applied to sliding surfaces of the toggle pins and the toggle bushings.

Since the toggle-type mold-clamping apparatus of the present invention is provided with the above construction, the apparatus of the present invention is excellent in durability and in mold-clamping accuracy, and further excellent in that its swinging loads in the toggle portion thereof is low.

Further, in the second embodiment of the present invention shown in FIG. 11, as is in the case of the first embodiment of the present invention, the toggle-type mold-clamping apparatus of the present invention comprises: the first swingable arm 20 an end of which is connected to the tail stock 10; the second swingable arm 22 connected to the first swingable arm 20 in its one end and to the movable die plate 13 in the other end thereof; and the third swingable arm 36 connected to the first swingable arm 20 in its one end and to the cross-head 18 in the other end thereof, in which apparatus a longitudinal axis of the third swingable arm 36 obliques from a line perpendicular to the center line of the machine at a predetermined angle "θ", so that the stroke Xc of the mold-clamping cylinder 16 between the position where the largest load is applied to the mold-clamping cylinder 16 before completion of the mold closing operation and the position where the mold closing operation is completed can be shortened to make it possible to shorten the mold opening/closing operation cycle-time without any droppage of the surplus mold-clamping force, whereby the mold opening/closing operation is smoothly conducted and a necessary longitudinal length of the mold-clamping apparatus can be reduced.

The embodiments of the present invention are described in combination with the injection molding machine in the above. However, it is also possible to employ the apparatus of the present invention in combination with any other suitable machine such as a die-cast machine and the like.

What is claimed is:

1. In a toggle-type mold-clamping apparatus comprising at least a pair of arms being swingable relative to each other and toggle pins for swingably connecting said arms, the improvement wherein: further comprised are toggle bushings each of which is constructed of a cylinder element and a plurality of pellets, in which cylinder element is formed an insertion-hole for receiving said toggle pins therein, said pellets being made of solid lubricants and embedded in a peripheral wall portion of said cylinder element at intervals of a predetermined distance so as to be exposed to an inner peripheral surface of said cylinder element, said toggle bushings being fixed to said arms in their toggle-pin inserting portions so that toggle pins are inserted into said insertion-holes of said toggle bushings, while a lubricant film made of a grease mixed with fine particles of a solid lubricant is applied to sliding surfaces of said toggle pins and said toggle bushings.

2. The toggle-type mold-clamping apparatus as set forth in claim 1, wherein: a rust-resisting metal plating is applied to said toggle pins in their surfaces.

3. The toggle-type mold-clamping apparatus as set forth in claim 2, wherein: said toggle pin is made of chrome-molybdenum steel; and said rust-resisting metal plating is a hard chromium plating.

4. The toggle-type mold-clamping apparatus as set forth in claim 1, wherein: a surface roughness in a peripheral surface of said toggle pin and in an inner peripheral surface of said toggle bushing is up to 3 S (3/1000 mm).

5. The toggle-type mold-clamping apparatus as set forth in claim 1, wherein: the plurality of said pellets made of said solid lubricant are embedded in upper and lower end surfaces of said toggle bushing at intervals of said predetermined distance so as to be exposed in said end surfaces of said toggle bushing.

6. The toggle-type mold-clamping apparatus as set forth in claim 1 or 5, wherein: said pellet is constructed of a mixture of graphite and molybdenum disulfide.

7. The toggle-type mold-clamping apparatus as set forth in claim 1 or 5, wherein: a ratio of a total area of the exposed surfaces of said pellets to a total area of the sliding surfaces of said toggle bushing is within a range of 20 to 40%.

8. The toggle-type mold-clamping apparatus as set forth in claim 1, wherein: said fine particles of said solid lubricant being mixed with said grease are made of a material selected from the group consisting of molybdenum disulfide and graphite.

9. The toggle-type mold-clamping apparatus as set forth in claim 1, wherein: 5-20% by weight of said fine particles of said solid lubricant is added to said grease.

10. The toggle-type mold-clamping apparatus as set forth in claim 1, wherein: said fine particles of said solid lubricant is added to said grease to adjust a consistency of said grease to a grade of #0 to #2.

11. The toggle-type mold-clamping apparatus as set forth in claim 1, wherein: an oil-feed hole is provided in said toggle pin so as to extend from at least one end surface of said toggle pin to a peripheral surface of the same, said oil-feed hole being filled with said grease mixed with said fine particles of said solid lubricant.

12. The toggle-type mold-clamping apparatus as set forth in claim 11, wherein: said oil-feed hole is constructed of: an axial oil-feed hole extending halfway from an upper end surface of said toggle pin; and a radial oil-feed hole communicating with said axial oil-feed hole and extending radially to open to a peripheral surface of said toggle pin so as to provide a divergent opening in said peripheral surface of said toggle pin.

13. The toggle-type mold-clamping apparatus as set in claim 1, wherein: an elongated groove is formed in an end surface of said toggle pin, which elongated groove radially extends across said end surface of said toggle pin; and a connecting member is inserted in said elongated groove so that opposite end portions of said connecting member project radially from said end surface of said toggle pin and are fixed to one of said pair of arms, whereby said toggle pin is prevented from rotating.

14. A toggle-type mold-clamping apparatus comprising: a first swingable arm connected to a tail stock in its one end; a second swingable arm connected to the other end of said first swingable arm in its one end and connected to a movable plate in the other end thereof; and a third swingable arm connected to said first swingable arm in its one end and connected to a cross-head in the other end thereof; wherein: a longitudinal direction of said third swingable arm obliques from a line perpendicular to a moving direciton of said movable plate at a predetermined angle in a range of from 10° to 20° in a direction away from said movable plate at a position where said movable plate has moved to its furthest extent; said arms are swingably connected with each other through said toggle pins which are inserted into insertion-holes formed in cylinder elements which form toggle bushings in cooperation with a plurality of pellets embedded in peripheral surfaces of said cylinder elements at intervals of a predetermined distance so that said pellets are exposed to an inner peripheral surface of each of said cylinder elements; said toggle bushing is fixed to toggle-pin inserting portions of said arms; said toggle pin is inserted into an insertion-hole of said toggle bushing; and a lubricant film is applied to sliding surfaces of said toggle pin and said toggle bushing, said lubricant film is constructed of a grease mixed with fine particles of a solid lubricant.

15. The toggle-type mold-clamping apparatus as set forth in claim 14, wherein: a rust-resisting metal plating is applied to said toggle pin in its surface.

16. The toggle-type mold-clamping apparatus as set forth in claim 15, wherein: said toggle pin is made of chrome-molybdenum steel; and rust-resisting metal plating is a hard chrome plating.

17. The toggle-type mold-clamping apparatus as set forth in claim 14, wherein: a surface roughness in a peripheral surface of said toggle pin and in an inner peripheral surface of said toggle bushing is up to 3 S (3/1000 mm).

18. The toggle-type mold-clamping apparatus as set forth in claim 14, wherein: the plurality of said pellets are embedded also in upper and lower end surfaces of said toggle bushing at intervals of a predetermined distance so as to be exposed to said end surfaces of said toggle bushing.

19. The toggle-type mold-clamping apparatus as set forth in claim 14 or 18, wherein: said pellet is constructed of a mixture of graphite and molybdenum disulfide.

20. The toggle-type mold-clamping apparatus as set forth in claim 14 or 18, wherein: a ratio of a total area of the exposed surfaces of said pellets to a total area of sliding surfaces of said toggle bushing is in a range of 20 to 40%.

21. The toggle-type mold-clamping apparatus as set forth in claim 14, wherein: said fine particles of said solid lubricant to be mixed with said grease are made of a material selected from the group consisting of molybdenum disulfide and graphite.

22. The toggle-type mold-clamping apparatus as set forth in claim 14, wherein: 5-20% by weight of said fine particle of said solid lubricant is added to said grease.

23. The toggle-type mold-clamping apparatus as set forth in claim 14, wherein: said fine particle is added to said grease to adjust a consistency of said grease to a grade of #0 to #2.

* * * * *